Oct. 22, 1929.  H. N. COX  1,732,432
LENS SYSTEM
Filed June 30, 1928  2 Sheets-Sheet 1
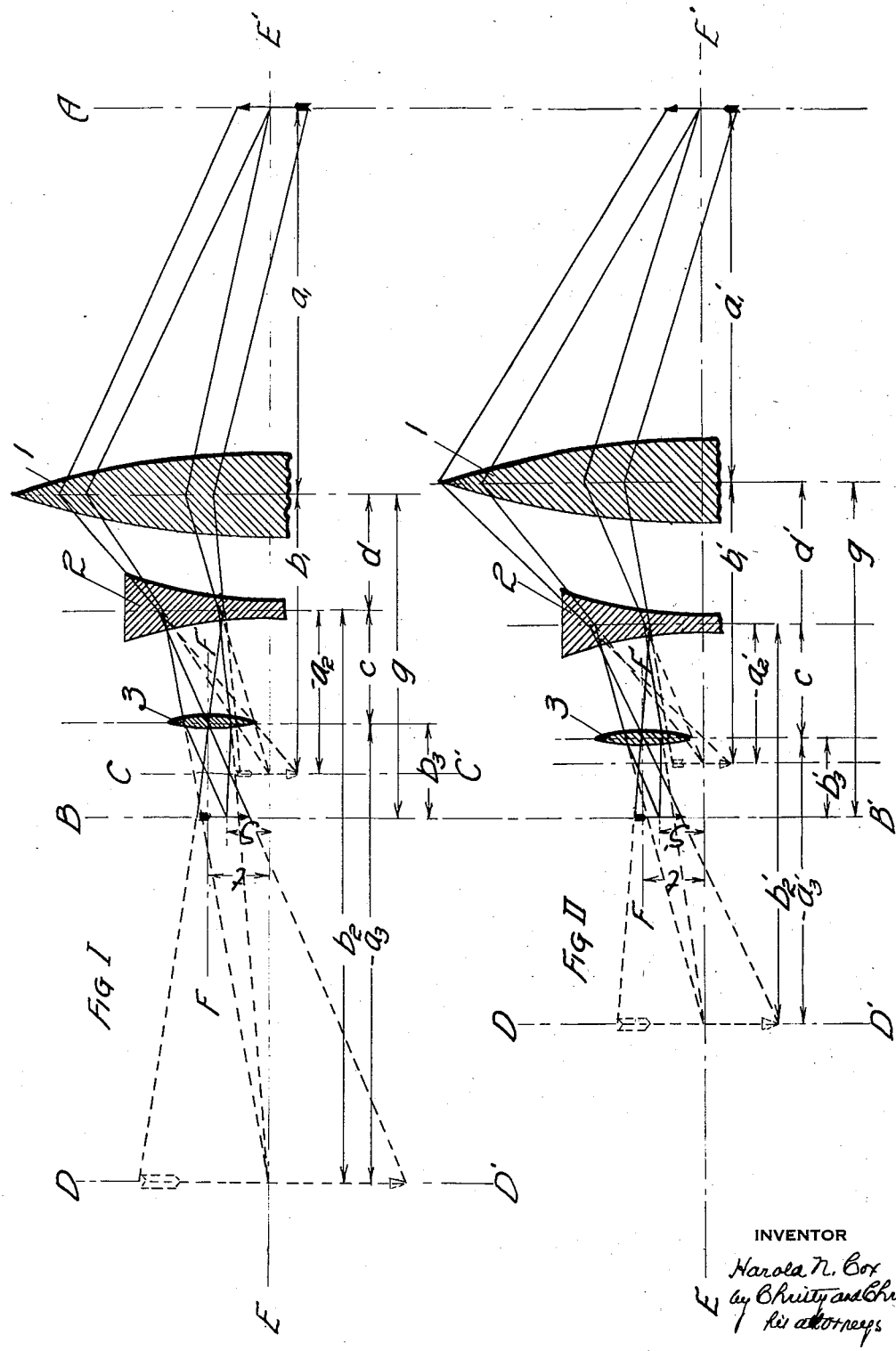
INVENTOR
Harold N. Cox
by Christy and Christy
his attorneys

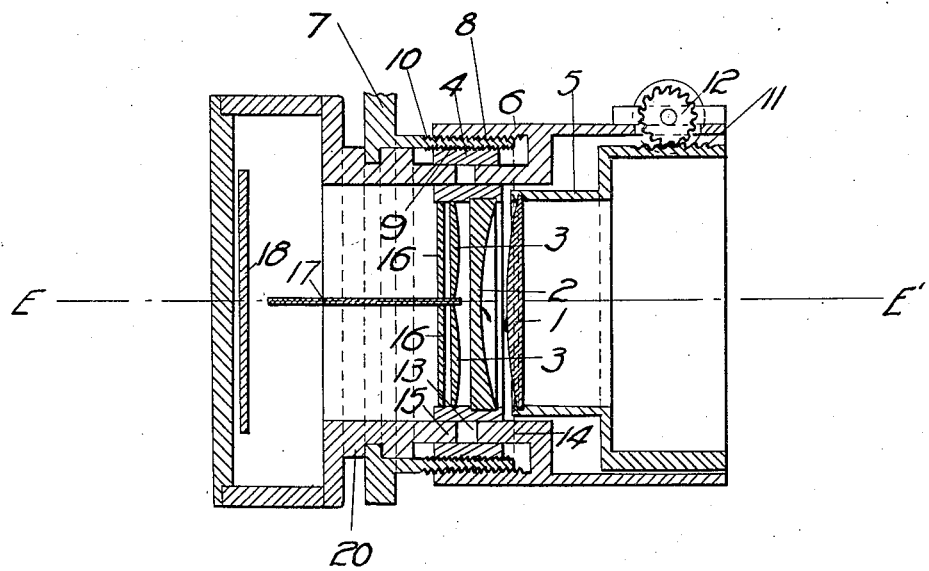
Fig III
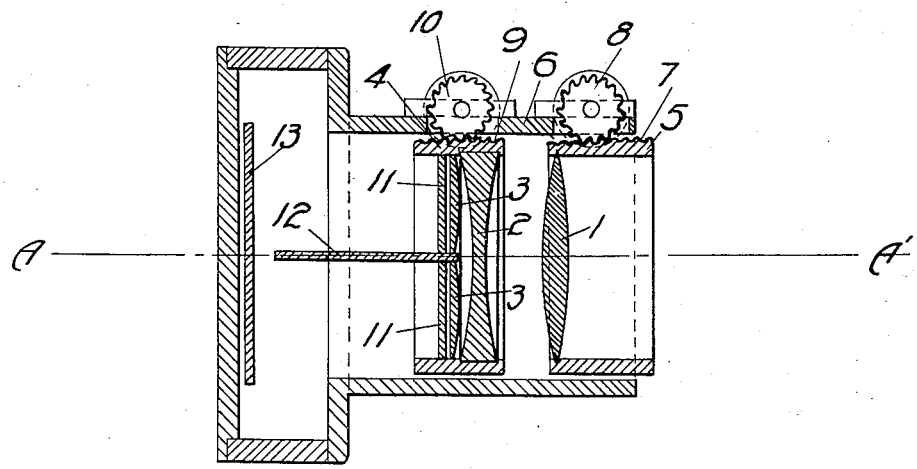
Fig IV

Patented Oct. 22, 1929

1,732,432

UNITED STATES PATENT OFFICE

HAROLD N. COX, OF GLEN RIDGE, NEW JERSEY, ASSIGNOR TO COX MULTI-COLOR PHOTO COMPANY, OF PITTSBURGH, PENNSYLVANIA, A CORPORATION OF DELAWARE

LENS SYSTEM

Application filed June 30, 1928. Serial No. 289,480.

My invention relates to optical instruments, and specifically to improvements in lens systems for the transmission of multiple images, both in the taking of the picture and in the projection of it. The transmission of multiple images is an incident to color photography and there finds practical application.

The lens system with which I am concerned is combined with means for sustaining a film extended in a plane, and includes a plurality of objective lenses symmetrically placed about an axis perpendicular to the plane of the film, one objective for each of the colors employed, and an auxiliary compound lens arranged on the axis with respect to which the objectives first named are symmetrical, and cooperating simultaneously with the said objectives.

My invention has for its object the register of the images transmitted through the several objectives, and contains provision for correction of variations in film dimension. In practical service, and particularly in the projection of motion pictures, the film may, because of variation in temperature conditions, or in consequence of continued use, or for other reasons, or for two or more such reasons taken together, vary in its dimensions by as much as one and one half per cent, and, but for corrective provision, there will be failure of registry of the images upon the screen, as between films of varying dimensions.

It hitherto has been proposed to effect correction by causing the multiple objectives to move radially with respect to the common axis about which they are arranged. In the practice of my present invention I find it unnecessary to move the objectives radially, and I find that it is possible to attain the ends while maintaining the objectives at fixed distance from the axis about which they are arranged. The compound auxiliary lens includes a negative element and a positive element, and I have discovered that by building the multiple objectives and the negative lens element of the auxiliary lens as a unit together and by building the positive element of the auxiliary lens as a second unit, I may by adjusting the two units axially with respect to the film bring the images projected, to focus and to register upon the screen. Focusing is effected by adjustment of the second lens unit; registry of images by the first. And I have found that given fixed positions for film and for screen there is a position for the first lens element such as to afford registry of images, a position minutely variable as film dimensions vary, and there is for each position of the first unit a position for the second unit such as to afford sharpness of definition; and I have found that the adjustment of the two units may be coordinated, so that, in a given placement of film and of screen, adjustment of the second unit having initially been made to effect focusing, the adjustment of the first unit may be effected together with such simulaneous further adjustment of the second unit as will maintain sharpness of definition while registry of images is being effected.

I have found further that if the negative focal length of the negative element of the auxiliary lens be equal to the common focal length of the duplicate objectives, then their adjustment axially as a unit to effect registry of images will have no effect to disturb the focus obtained by adjustment of the other unit, that is to say the positive element of the auxiliary lens.

Referring to the accompanying drawings Figs. I and II are diagrams illustrative of the invention, and Figs. III and IV are views in axial section of two lens structures in which my invention is embodied.

Referring first to Fig. I, it may be understood that half of a lens assembly is here diagrammatically shown. One of the objectives is indicated at 3. It will be understood that a plurality of these are arranged symmetrically about the axis E E'. The auxiliary lens here includes two members, a concave member 2 and a convex member 1, and these two elements which make up the auxiliary lens cooperate simultaneously with the plurality of objectives, to transmit simultaneous images to or from a film situated in the plane indicated by the line B B'. It may be assumed that from a film situated in the plane B B' simultaneous images are to be projected to a screen situated in the plane indicated by the line A A'. It will of course be understood that in this diagram no attempt is made to give proportionate dimensions as between lens and film and as between lens and screen. It is a diagram merely, to show relative positions.

In Fig. I the distance indicated at $s$ will be perceived to be a function of the spacing of the multiple images upon the film arranged in the plane B B', and the distance $t$ will be perceived to be a function of the spacing of the objectives 3 from the axis about which they are arranged, and from one another. In this instance the objective 3 is placed at a distance from the plane B B' of the film less than the focal length of the objective 3, and at such distance that the virtual image projected by the objective in the plane D D' is centered on the axis E E'. This virtual image becomes the virtual object of the auxiliary lens made up of the parts 2 and 1, and the members of the auxiliary lens are so adjusted that their real image is formed in the plane A A', which is the plane in which the screen extends, and this image is centered on the axis E E'.

If the spacing $s$ of the multiple images were greater than the spacing $t$ of the lenses 3 one from another, the objectives 3 would stand at a distance from the plane B B' of the film greater than the focal length of the objectives. The image would then be a real image formed in a plane to the right of the objectives, as seen in this diagram, and this real image would become in turn the virtual object of the auxiliary lens 2, 1.

The following mathematical relations are true, whether the image spacing $s$ be greater or less than the lens spacing $t$.

Let $f_1=$ focal length of lens 1
$f_2=$ " " " " 2
$f_3=$ " " " " 3

$$m=\frac{s}{t}$$

Then since $\frac{s}{t}=\frac{a_3+b_3}{a_3}$ and $a_3=\frac{b_3 f_3}{b_3-f_3}$ $m=\frac{b_3}{f_3}$ or $b_3=f_3 m$ (Equation 1) and $a_3=\frac{f_3 m}{m-1}$ Since $b_2=c-a_3=c-\frac{f_3 m}{m-1}$ and $a_2=\frac{b_2 f_2}{b_2-f_2}$ $$a_2=\frac{f_2 f_3 m-f_2 c(m-1)}{f_3 m+(f_2-c)(m-1)}$$

Since $b_1=d-a_2$ and $b_1=\frac{a_1 f_1}{a_1-f_1}$ $$d=\frac{a_1 f_1}{a_1-f_1}+\frac{f_2 f_3 m-f_2 c(m-1)}{f_3 m+(f_2-c)(m-1)}$$

Then $g=b_3+c+d=f_3 m+c+\frac{a_1 f_1}{a_1-f_1}+\frac{f_2 f_3 m-f_2 c(m-1)}{f_3 m+(f_2-c)(m-1)}$ (Equation 2)

Equation 1 represents the movement of the multiple objectives with respect to the film as the ratio $m$ of image spacing to lens spacing is varied.

Equation 2 represents the movement of lens 1 with respect to the film as the ratio $m$ and the distance $a_1$ are varied. When $a_1$ is constant and $c$ is small, the curve of Equation 2 may be assumed to be a straight line within the limits of movement encountered in practice.

Fig. II shows the condition when adjustment has been made for an image spacing smaller than that of Fig. I, while $f_1, f_2, f_3, t, c$ and the distance between planes A A' and B B' have been maintained constant. Lenses 2 and 3 have been moved nearer to the film, but their new position still is responsive to Equation 1. The position of lens 1 was located by calculating the distance $a_1^1$ as follows:

$$a_1^1+b_1^1=b_3+d-a_1-b_3^1-a_2^1=k, \; a_1^1=\frac{k+\sqrt{k^2-4kf_1}}{2}$$

Lens 1 may be located also by $d^1=b^1+a_2^1$ where $b_1^1=\frac{k-\sqrt{^2-4kf_1}}{2}$ The use of Equation 2 for calculating the position of lens 1, except in the special case where $f_2=-f_3$ (referred to below), introduces a slight error because $a_1^1$ depends upon the position of lens 1; but the movement of lens 1 is, in practice, so small compared to the distance of $a_1^1$ that the error is negligible if $a_1^1$ is taken as being equal to $a_1$.

Since in the system shown in Figs. I and II, there are three or, when lens 2 is fixed with respect to lens 3, two independent adjustments to be made for the change of image spacing necessary to maintain focus and register on a screen at fixed distance, the adjustments can not be made rapidly. If, however, the system be mounted in such manner that, by means of a single movement of a ring, pinion, or lever lenses 2 and 3 move as a unit, according to Equation 1, and if lens 1 moves according to Equation 2, and if (as is possible) means be provided for simultaneity of the two movements in proper ratio, practically instantaneous adjustment can be made. A device embodying this feature is shown in Fig. III.

Referring to Fig. III, the lenses of the multiple objective are indicated at 3. 2 is the concave member of the auxiliary lens, and 1 is the convex member of the auxiliary lens. 5 is the carrier for the convex member 1. 6 is an outside tube, and 7 is a ring rotatable upon the lens barrel 20, but without longitudinal progression thereon, that is to say, it is rotatable without longitudinal progression in the direction of the axis E E'. This ring 7 is provided with a tubular extension 8 which is screw threaded both internally and externally. The internal screw thread engages a corresponding thread on a carrier 4; the external screw thread is of opposite turning and engages a thread on the tube 6. In carrier 4 are mounted the multiple objectives 3 and negative member 2. In the tube 6 the lens member 1 is borne. Between the tube 6 and the carrier 5 which immediately carries the lens member 1, a rack and pinion engagement 11, 12 is interposed, by means of which carrier 5 may be moved longitudinally with respect to the tube 6. The carrier 4 is slotted, and arms 14 integral with the tube 6 and arms 15 integral with the lens barrel 20 enter these slots and prevent angular movement of the carrier 4 and of the tube 6, but cause these parts to move longitudinally only in response to the turning of the ring 7 in its mounting upon the lens barrel 20.

By predetermining and preestablishing a fixed relation in the matter of the pitch of the screw threads by which the ring 7 engages the carrier 4 and the tube 6, it will be perceived that in response to the turning of the ring 7 the two relatively movable units, the one consisting of the objectives 3 and the negative lens element 2 (mounted in the carrier 4) and the positive element 1 (mounted in the tube 6) may be caused to move relative to the film and relative one to the other in fixed and predetermined ratio.

Fig. III shows also color filters 16, dividing septum 17, and film 18, all diagrammatically arranged within a camera.

Given this asembly illustrated in Fig. III, and assuming that the lens structure is being used for projecting an image upon a screen, the focusing of the images which the film 18 bears, upon a screen situated to the right, is effected by the adjustment of the lens element 1 alone, and this is effected by means of the rack and pinion 11, 12. Whatever be the position within the predetermined limitations of the lens parts 2 and 3 relatively to the lens part 1, focusing is primarily effected by the movement of the lens part 1 alone. When the focus has so been obtained, ring 7 is turned until the multiple images come to register. In this turning there will be no change in the relative positions of the lens parts 2 with respect to the lens part 3. Those members will move in unison, but they and the lens part 1 will have such relative movement with respect to the film and such relative movement one with respect to the other that while registry is effected, the focus already achieved is not disturbed.

Further simplification may be effected by causing the negative focal length of the lens part 2 to be equal to the positive focal length common to the objectives 3. This is illustrated in Fig. IV. As in the other case, the objectives 3 and the negative lens member 2 are borne in a common carrier 4. The lens element 1 will under these conditions occupy a fixed position for any given screen distance. In operation the lens element 1 will be adjusted independently, as in the figure it is shown to be adjustable, to effect focusing; and when focus has been determined, the carrier 4 is adjusted independently, as it is shown to be adjustable, to bring the multiple images to register, that is to say, to eliminate the factor of variation in film dimensions. And in such adjustment of carrier 4 with its lens members 3 and 2, there is (the focal length being such as defined above) no disturbance of the focus, gained initially by the adjustment of lens member 1.

The mathematical statement of the lens assembly of Fig. IV is as follows:

In Equation 2 above, let $c=o$ and $f_2=-f_3$. Then $$g=\frac{a_1 f_1}{a_1-f_1}$$

This equation is independent of the ratio $m$, and, since $f_1$ is constant, it depends only upon the distance $a_1$.

The condition $c=o$ signifies that the back equivalent plane of lens 2 coincides with the front equivalent plane of lens 3. If, however, lens 2 is fixed in a position immediately in front of lens 3, as shown in Fig. IV, the error introduced is, in practice, negligible.

I claim as my invention:

1. In an optical instrument for the simultaneous projection of multiple images, the combination with means for sustaining a film extended in a plane, of a lens assembly including a plurality of objectives symmetrically arranged about an axis perpendicular to the plane of the film and an auxiliary lens including a negative and a positive element both arranged on that axis, the lens assembly being built as two units, the first unit including the plurality of objectives and the negative element of the auxiliary lens, and the second unit including the positive element of the auxiliary lens, the lens assembly being adjustable axially, whereby image registry may be effected, and the second unit being further adjustable axially independently of the first, whereby focusing may be achieved.

2. In an optical instrument for the simultaneous projection of multiple images, the combination with means for sustaining a film extended in a plane, of a lens assembly including a plurality of objectives symmetrically arranged about an axis prependicular to the plane of the film, and an auxiliary lens including a negative and a positive element, both arranged on that axis, the negative focal length of the said negative element being equal to the positive focal length of the said objectives, the lens assembly being built as two units, the first unit including the plurality of objectives and the negative element of the auxiliary lens, and the second unit including the positive element of the auxiliary lens, the two units being axially adjustable each independently of the other.

In testimony whereof I have hereunto set my hand.

HAROLD N. COX.